United States Patent [19]

Yu

[11] Patent Number: 5,605,089

[45] Date of Patent: Feb. 25, 1997

[54] COFFEE CUP

[76] Inventor: Yeung J. Yu, No. 46, Santso Wu, San-Min Li, Chuangli City, Taoyuan Hsien, Taiwan

[21] Appl. No.: 543,491

[22] Filed: Oct. 16, 1995

[51] Int. Cl.⁶ .................................................. A47J 31/10
[52] U.S. Cl. ............................................. 99/306; 99/317
[58] Field of Search ........................... 99/279, 306, 316, 99/317, 307; 426/433

[56] References Cited

U.S. PATENT DOCUMENTS

| | | | |
|---|---|---|---|
| 4,627,334 | 12/1986 | Shanklin | 99/306 |
| 4,785,723 | 11/1988 | Sheen | 99/279 |
| 5,010,221 | 4/1991 | Grossman | 99/306 |
| 5,424,083 | 6/1995 | Lozito | 99/306 |

FOREIGN PATENT DOCUMENTS 338326  11/1930  United Kingdom ..................... 99/306

*Primary Examiner*—Robert W. Jenkins
*Attorney, Agent, or Firm*—Larson and Taylor

[57] ABSTRACT

The present invention relates generally to a coffee cup and in particular to a cup set having three different layers, where the first layer is a cup-like container having a filter formed therein, and the second layer is a coffee cup being used to receive the filtered coffee, the third layer is a base formed beneath the second layer which is supported by the same.

6 Claims, 4 Drawing Sheets

COFFEE CUP

FIELD OF THE INVENTION

The present invention relates generally to a coffee cup and in particular to a cup set having three different layers, where the first layer is a cup-like container having a filter formed therein, and the second layer is a coffee cup being used to receive the filtered coffee, the third layer is a base formed beneath the second layer which is supported by the same.

BACKGROUND OF THE INVENTION

In our daily life, influenced by the wonderful smell and by the encouragement of environment, the number of coffee drinkers have gradually increased. Owing to the increasing coffee drinking population, and also because of the their special criticism to the coffee, a variety of coffee makers are being produced to meet the different requirements of the coffee drinkers.

Among the most popular coffee makers, two of them are the most common types known to the art, one is electric-type coffee maker using electricity as the source of boiling the water, the other is using alcohol as the source of the heating procedure; the electric-type coffee maker uses electricity to heat up the metal pipes formed therein, and the heat from the metal pipes will boil the water and then gradually using the boiling water to achieve the desired filtering effect; the alcohol type coffee maker uses the characteristic feature of alcohol to boil the water inside the coffee maker, and then step by step the boiled water inside the coffee maker will drip into the coffee powder which will then be dissolved by the boiled water and become liquid coffee dripping into a container. These two kinds of coffee makers both can achieve the desired purpose of dissolving the coffee powder into liquid type coffee, yet, because the facilities of achieving the desired purpose require electricity, alcohol, different kinds of cups and even tender caring during the filtering procedure, they are generally considered to be indoor use. Once we are out of the house, and still want to have fresh coffee ready to be served, these two kinds of coffee makers are almost impossible to serve this kind of requirement, even the alcohol type coffee maker can not meet this purpose, unless a lot of precautions are being taken into consideration before making a pot of fresh coffee.

It is therefore desirable to provide a coffee maker for making fresh coffee in any difficult situation, which is simple in structure and thus cheap in cost to be used for personal requirement.

SUMMARY OF THE INVENTION

An object of the present invention is to provide a coffee maker which is simple in structure, easy to use and cheap in cost for personal requirement of making fresh coffee.

It is another object of the present invention to provide a filtering device for filtering the dissolved coffee powder, which is simple in structure and cheap in cost.

It is a further object of the present invention to provide a thermal isolation base having a handle formed on the side of its outer wall, and multiple projections in the bottom of the base, which is designed to support the coffee cup and to isolate the heat from the liquid coffee.

To achieve the above objections, there is provided a filtering device for filtering the dissolved coffee powder comprising a thermal insolation cover and a filtering net. The thermal insolation cover is provided to close the top opening for the preservation of thermal energy of the high temperature of the water added into the device. A filtering net is provided to filter out the dissolved coffee powder and provide fresh coffee. A coffee cup having its upper radius slightly bigger than the radius of the filtering device is connected directly under the filtering device, for receiving the dripping coffee. And a base formed to receive the coffee cup and to isolate the heat of the dissolved coffee cup has multiple projections formed inside the base which is connected directly under the coffee cup to support and to provide stability to the coffee cup.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
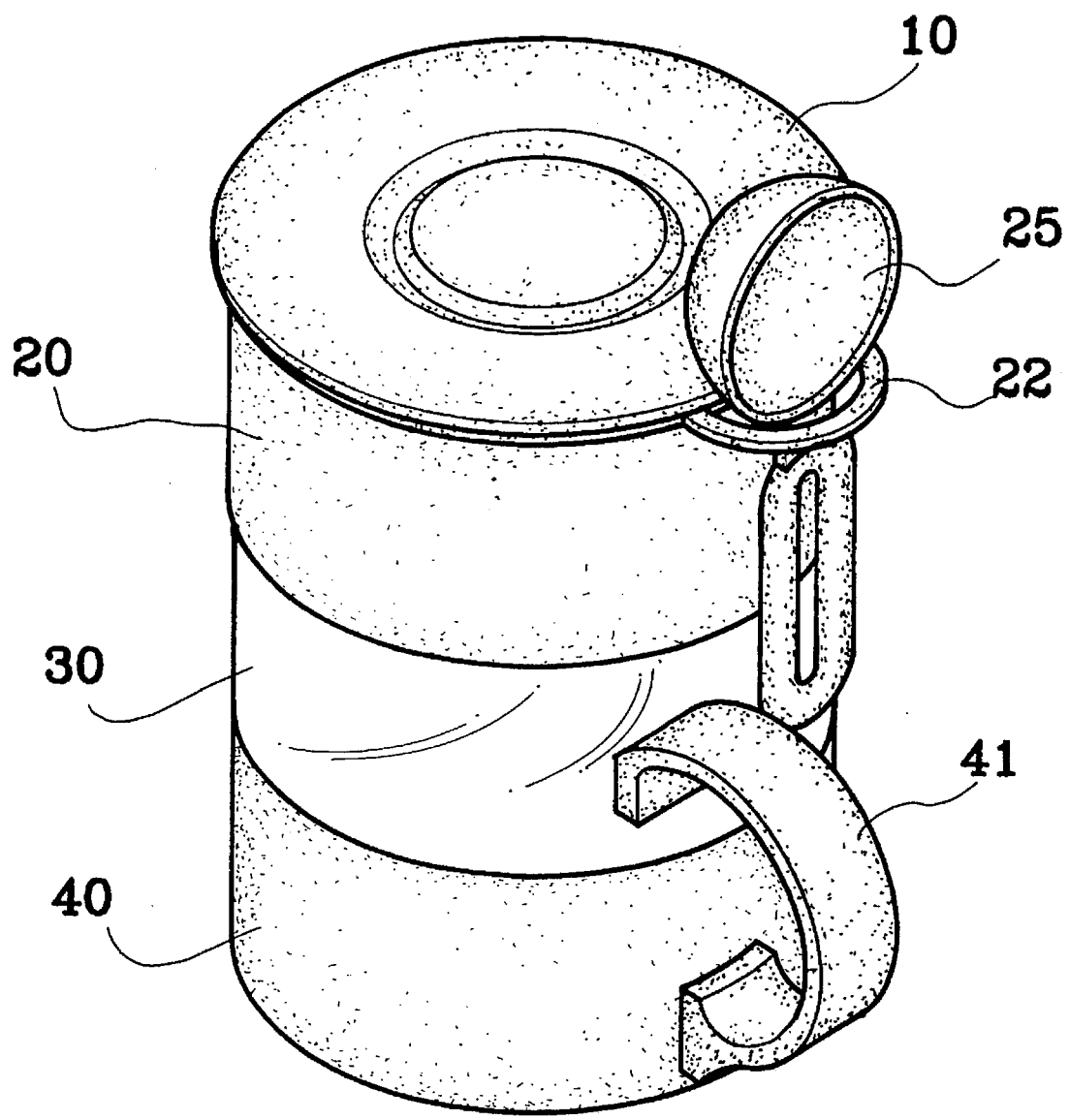
FIG. 1 is a perspective view showing a coffee cup constructed in accordance with the present invention.
Figure 2:
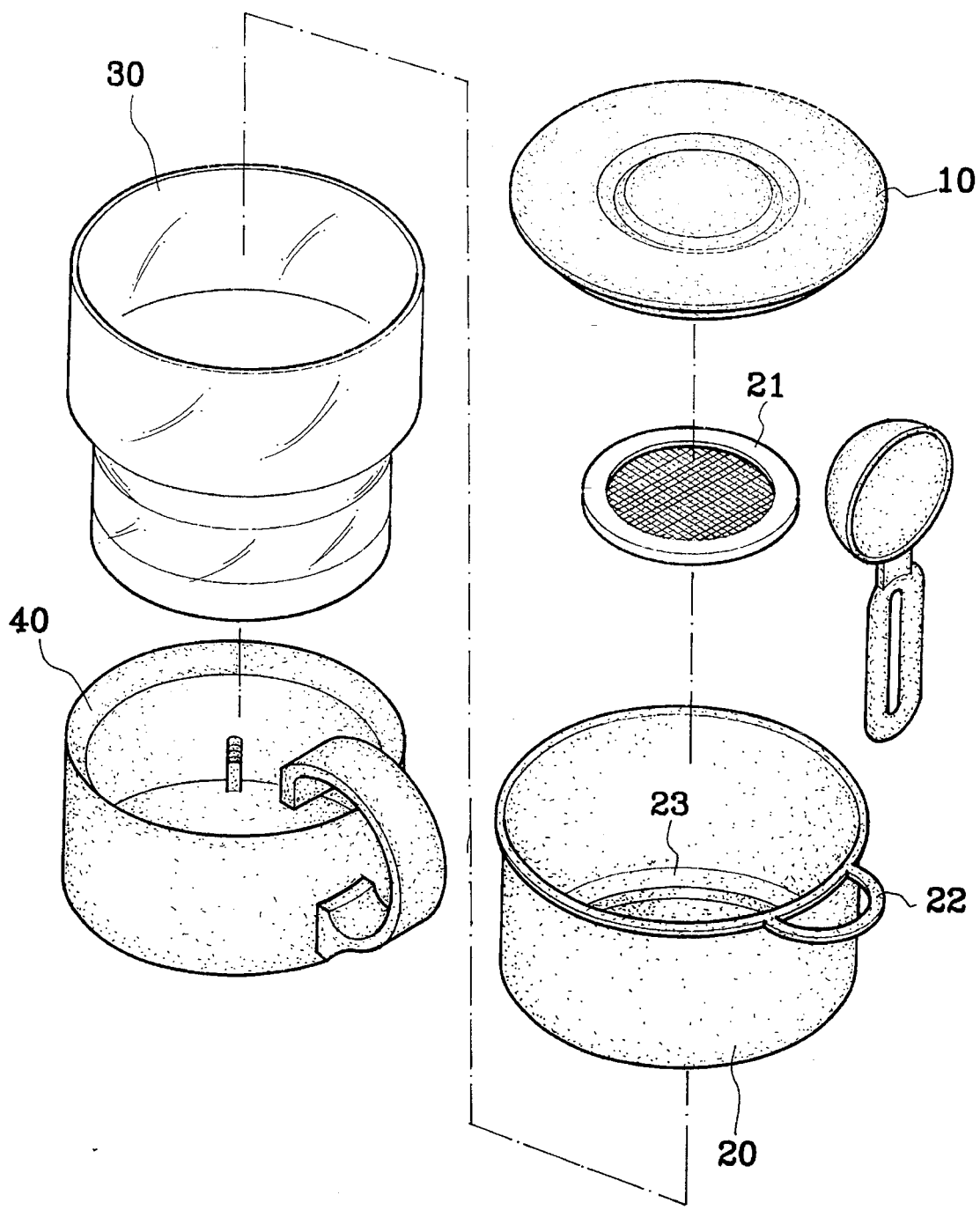
FIG. 2 is an explosion view of the present invention showing the elements comprised therein.
Figure 3:
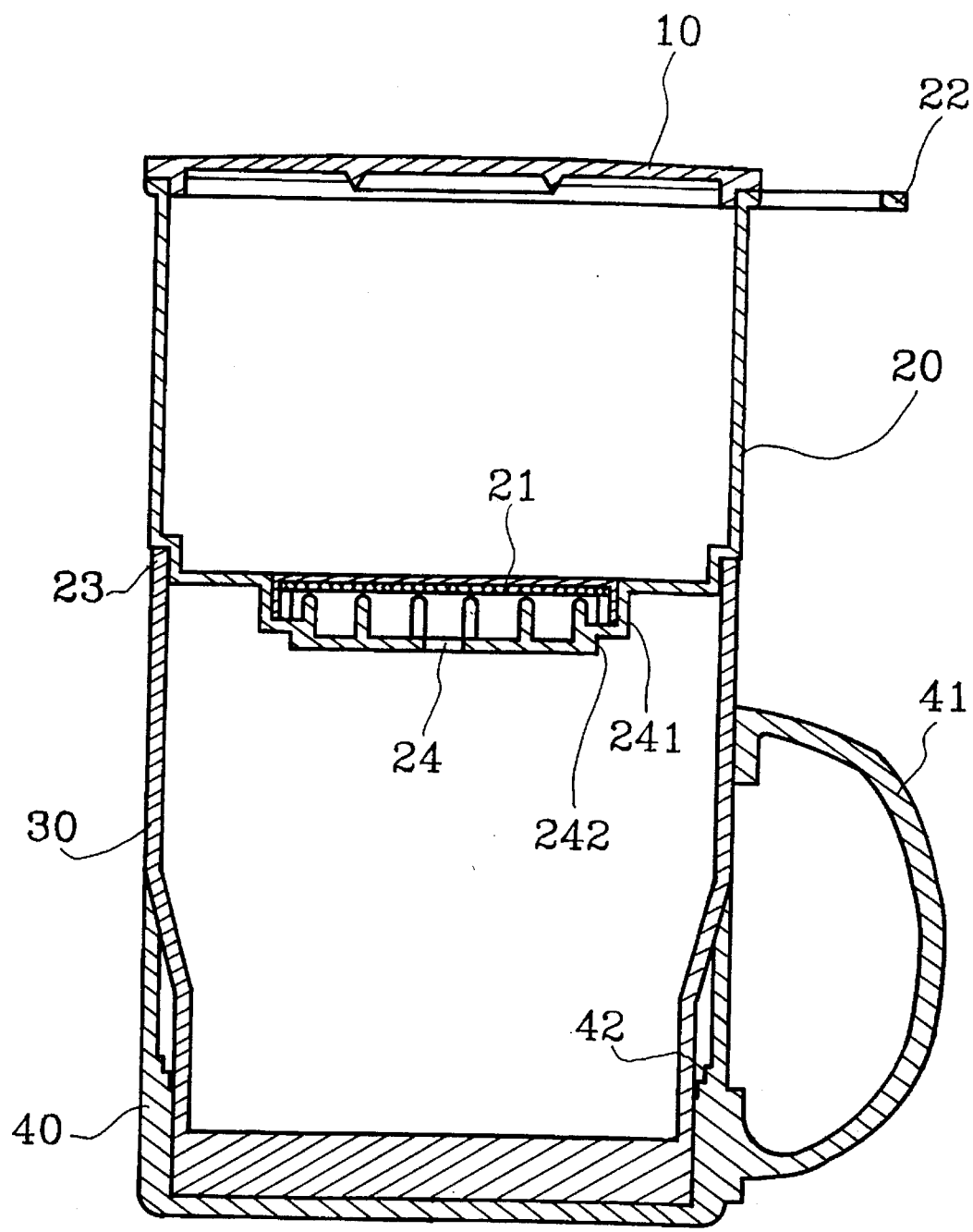
FIG. 3 is a cross sectional view showing the inside structure of the base.

Referring to FIG. 1 and FIG. 2, a coffee cup comprises a container 20 having a thermal insolation cover 10 used to cover the upper opening of the container 20, a glass cup 30 and a base 40 where the glass cup 30 is housed therein. The cover 10 is used to close the upper opening of the container 20, and a circular part or handle 22 is formed at the upper end of the container 20, for holding a spoon 25. The radius of the lower part 23 of container 20 is smaller than the upper part. As seen in FIG. 3, an opening 24 formed through the bottom of the container 20 has an outer, bigger portion 241 and an inner, smaller portion 242. The diameter of portion 241 is just slightly bigger than the diameter of a filter 21 for receiving the filter 21. Through the hole formed in the center of portion 242, the filtered coffee will then flow into the glass cup 30. Cup 30 has a diameter which is a little bigger than the bottom of the container 20, therefore, the glass cup 30 can be mounted onto container 20 with these two surfaces tightly engaged. The lower part of the glass cup 30 also comprises a portion having smaller diameter for receiving a base 40 formed beneath the glass cup 30. The base 40 acting as a cushion to the glass cup 30 has a handle 41 formed on the side of the base 40. The upper end of the handle 41 is not attached and extends higher than the base 40 so as to be in contact with the glass cup 30.

Referring to FIG. 3, the sectional view of the present invention, on the bottom side of the base 40, purity projections 42 are formed to act as cushion to the glass cup 30, and to receive the glass cup 30 therein.

Figure 4:
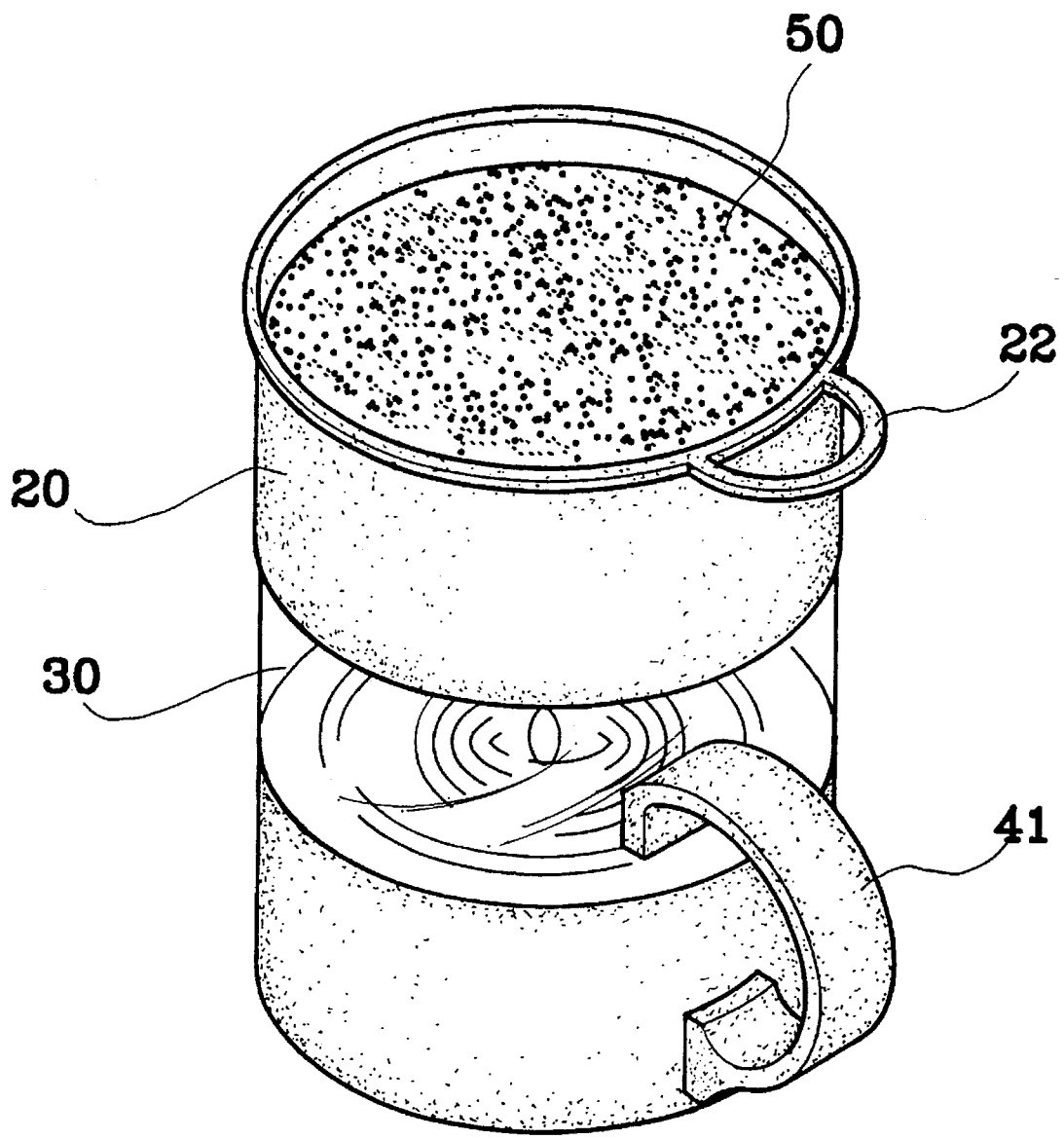
FIG. 4 is a perspective view, with parts removed, of the preferred embodiment of the present invention showing the coffee powder inside the container and the coffee cup receiving the filtered coffee with the top cover of the container removed and the base connected right under the cup.

The best embodiment of the present invention is shown in FIG. 4. When using the coffee cup, first lift off the cover 10, and put certain amount of coffee powder 50 in the container 20. Then assemble and then the rest of the parts of the coffee cup as previously described. When all the parts of the coffee cup are assembled together, hot water is added to the container 20, then the coffee powder 50 in the container 20 will gradually dissolve and flow into the glass cup 30. After a while, a fresh, strong coffee is ready.

Thus, although the invention has been shown and described with respect to exemplary embodiments thereof, it should be understood by those skilled in the art that the aformentioned changes and various other changes, thereto, can be made without departing from the spirit and scope of the invention.

What we claimed is:

1. A coffee cup comprises a thermal insulation cover, a container that can receive a filter therein and having an upper part and a lower part, a glass cup and a base for receiving the glass cup, characterized in that: the cover closes the upper opening of the container, and the upper end of the container having an integrally formed part with which the cover mates; the container having a radius of the lower part thereof that is smaller than the radius of the upper part thereof, the lower part having a central opening, the opening defined by a surface having an outer, bigger portion and an inner, smaller portion so as to receive a filter therein, the glass cup having an upper diameter which is a little bigger than the diameter of the bottom of the container so as to permit the container to receive the glass cup, the cup having a lower part comprising a portion having a smaller diameter for receiving the base thereunder, the base having a handle on the side of the base, with one end of the handle attached to the base and the other end of the handle extending higher than the base and having a shape so as to be in contact with the glass cup when inserted in the base, the base, having means therein for cushioning the glass cup.

2. A coffee cup as claimed in claim 1 wherein a part at the upper end of the container has a circular cross-section.

3. A coffee cup as claimed in claim 1 wherein said cushioning means comprises projections formed in the bottom side of the base.

4. A coffee cup as claimed in claim 1 and further comprising a means for holding a utensil, said holding means being rigidly attached to the top of the container.

5. A coffee cup as claimed in claim 4 wherein said holding means comprises a circular loop.

6. A coffee cup as claimed in claim 1 wherein said handle has an arcuate shape and has a first, lower end attached to said base, and a free, unattached upper end that engages said glass cup when said cup is inserted in said base.

* * * * *